US011887451B2

(12) United States Patent
Buchholz et al.

(10) Patent No.: US 11,887,451 B2
(45) Date of Patent: Jan. 30, 2024

(54) HAZARD DETECTOR WITH OPTICAL STATUS INDICATOR

(71) Applicant: Carrier Corporation, Palm Beach Gardens, FL (US)

(72) Inventors: Matthew J. Buchholz, Canon City, CO (US); Kenneth J. Mott, Colorado Springs, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/747,519

(22) Filed: May 18, 2022

(65) Prior Publication Data

US 2022/0277634 A1 Sep. 1, 2022

Related U.S. Application Data

(63) Continuation of application No. 16/629,838, filed as application No. PCT/US2018/041267 on Jul. 9, 2018, now Pat. No. 11,354,995.

(60) Provisional application No. 62/530,728, filed on Jul. 10, 2017.

(51) Int. Cl.
*G08B 17/117* (2006.01)
*G08B 5/38* (2006.01)

(52) U.S. Cl.
CPC .............. *G08B 17/117* (2013.01); *G08B 5/38* (2013.01)

(58) Field of Classification Search
CPC .... G08B 17/113; G08B 17/10; G08B 17/107; G08B 17/12; G08B 17/117; G08B 17/06; G08B 17/11; G08B 17/103; G08B 17/125; G08B 5/36; G08B 5/38
See application file for complete search history.

(56) References Cited

U.S. PATENT DOCUMENTS

| | | | | |
|---|---|---|---|---|
| 3,875,561 A | | 4/1975 | Scarpino et al. | |
| 3,916,209 A | * | 10/1975 | Steele | G08B 17/107 340/630 |
| 4,340,885 A | * | 7/1982 | Chavis | G08B 17/117 73/31.05 |
| 4,827,244 A | * | 5/1989 | Bellavia | G08B 29/145 340/630 |

(Continued)

FOREIGN PATENT DOCUMENTS

| | | |
|---|---|---|
| CN | 300781532 | 5/2008 |
| CN | 102789916 A | 11/2012 |

(Continued)

OTHER PUBLICATIONS

"3 LED Lights Stick Click Tap Cordless Touch Push Lamp Battery AAA Powered for Car"; Product Description; DHGate.com; Retrieved Online from https://www.dhgate.com/product/3-led-lights-stick-click-tap-cordless-touch/165611474.html; Feb. 25, 2019; 9 Pages.

(Continued)

*Primary Examiner* — Hoi C Lau
(74) *Attorney, Agent, or Firm* — CANTOR COLBURN LLP

(57) ABSTRACT

A life safety device includes a housing, a detector for detecting one or more conditions, and an actuatable mechanism coupled to the housing. The actuatable mechanism includes a light assembly operable in response to detection of at least one of the one or more conditions.

16 Claims, 9 Drawing Sheets

(56) References Cited

U.S. PATENT DOCUMENTS

| | | | | | |
|---|---|---|---|---|---|
| 4,968,860 | A * | 11/1990 | Shinohara | H01H 13/023 | 200/345 |
| 4,987,279 | A | 1/1991 | Hirose et al. | | |
| 5,103,383 | A | 4/1992 | Mayhew | | |
| 5,285,037 | A * | 2/1994 | Baranski | H01H 13/023 | 200/314 |
| 5,391,848 | A * | 2/1995 | Murphy | H01H 9/161 | 200/341 |
| 5,392,202 | A | 2/1995 | Herron | | |
| 5,785,410 | A | 7/1998 | Branson, Sr. | | |
| 5,813,519 | A * | 9/1998 | Gotoh | H01H 25/041 | 200/313 |
| 5,831,538 | A | 11/1998 | Schena | | |
| D412,924 | S | 8/1999 | Hiraguchi | | |
| 5,998,929 | A * | 12/1999 | Bechtel | H05B 39/042 | 315/159 |
| 6,348,860 | B1 | 2/2002 | Davis et al. | | |
| 6,388,220 | B1 * | 5/2002 | Sasaki | H01H 23/025 | 200/315 |
| 6,414,801 | B1 | 7/2002 | Roller | | |
| 6,425,678 | B1 | 7/2002 | Verdes et al. | | |
| 6,678,001 | B1 | 1/2004 | Elberbaum | | |
| D497,927 | S | 11/2004 | Arbuckle et al. | | |
| 6,858,812 | B2 | 2/2005 | Sasaki et al. | | |
| 6,902,287 | B2 | 6/2005 | Taylor | | |
| D513,477 | S | 1/2006 | Heftman | | |
| 7,079,041 | B2 | 7/2006 | Fredericks et al. | | |
| D544,805 | S | 6/2007 | Corrigan et al. | | |
| 7,235,752 | B1 * | 6/2007 | Chen | H01H 13/83 | 200/310 |
| D552,501 | S | 10/2007 | Lin et al. | | |
| D556,235 | S | 11/2007 | Todd et al. | | |
| D558,248 | S | 12/2007 | Togawa et al. | | |
| D560,244 | S | 1/2008 | Naruki | | |
| D564,557 | S | 3/2008 | Yamamoto et al. | | |
| D570,722 | S | 6/2008 | Taylor | | |
| 7,385,359 | B2 | 6/2008 | Dowling et al. | | |
| D584,756 | S | 1/2009 | Yamakawa | | |
| 7,482,712 | B2 | 1/2009 | Ford et al. | | |
| D591,697 | S | 5/2009 | Andrews et al. | | |
| D592,088 | S | 5/2009 | Miller | | |
| D598,316 | S | 8/2009 | Kuwano | | |
| D601,053 | S | 9/2009 | Ferrie et al. | | |
| 7,581,854 | B2 | 9/2009 | Ford | | |
| D605,966 | S | 12/2009 | Weil | | |
| 7,636,049 | B2 | 12/2009 | Ellul, Jr. | | |
| D612,760 | S | 3/2010 | Chen et al. | | |
| 7,699,603 | B2 | 4/2010 | Furner et al. | | |
| D616,780 | S | 6/2010 | Smith | | |
| 7,744,246 | B2 | 7/2010 | Rizkin et al. | | |
| 7,791,595 | B2 * | 9/2010 | Altonen | H05B 39/085 | 315/315 |
| D628,225 | S | 11/2010 | Deurwaarder | | |
| D633,120 | S | 2/2011 | Ham | | |
| D639,328 | S | 6/2011 | Zeinoun et al. | | |
| D639,843 | S | 6/2011 | Zeinoun et al. | | |
| 7,997,764 | B1 | 8/2011 | Nielson | | |
| D644,677 | S | 9/2011 | Park | | |
| D647,553 | S | 10/2011 | Park | | |
| 8,049,427 | B2 * | 11/2011 | Altonen | H05B 39/085 | 315/129 |
| D660,738 | S | 5/2012 | Yu | | |
| 8,232,884 | B2 | 7/2012 | Pattok et al. | | |
| 8,237,377 | B2 | 8/2012 | Hopper | | |
| D669,806 | S | 10/2012 | Stein | | |
| D669,807 | S | 10/2012 | Stein | | |
| D673,869 | S | 1/2013 | Yu | | |
| D684,078 | S | 6/2013 | Clifford et al. | | |
| 8,628,219 | B2 | 1/2014 | Peck et al. | | |
| D701,466 | S | 3/2014 | Clifford et al. | | |
| D709,782 | S | 7/2014 | Stuffle | | |
| 8,988,232 | B1 | 3/2015 | Sloo et al. | | |
| 9,035,786 | B2 | 5/2015 | Clifford et al. | | |
| D740,870 | S | 10/2015 | Park | | |
| D742,447 | S | 11/2015 | Stark et al. | | |
| 9,228,713 | B2 | 1/2016 | Skertic, Jr. et al. | | |
| 9,288,877 | B2 * | 3/2016 | Pratt | H05B 47/115 | |
| 9,332,610 | B2 * | 5/2016 | Kuo | G01J 1/0219 | |
| 9,345,098 | B2 * | 5/2016 | Joseph | H05B 45/20 | |
| 9,430,925 | B2 | 8/2016 | Mittleman | | |
| 9,466,194 | B1 | 10/2016 | Kraz et al. | | |
| 9,549,448 | B2 * | 1/2017 | Pope | H05B 45/10 | |
| 9,553,451 | B2 * | 1/2017 | Zacharchuk | H02J 3/00 | |
| 9,572,221 | B2 * | 2/2017 | Chang | F21V 23/0464 | |
| 9,618,184 | B2 | 4/2017 | Buchholz et al. | | |
| 9,622,321 | B2 * | 4/2017 | Creasman | G01J 1/0488 | |
| D798,934 | S | 10/2017 | Wu | | |
| 9,799,175 | B2 | 10/2017 | Stagg | | |
| 10,825,313 | B2 * | 11/2020 | Mott | G08B 19/00 | |
| 11,017,964 | B2 * | 5/2021 | Wu | H01H 13/50 | |
| D931,749 | S * | 9/2021 | Zhong | D10/106.5 | |
| 11,354,995 | B2 * | 6/2022 | Buchholz | G08B 5/36 | |
| 11,423,071 | B1 * | 8/2022 | Olshansky | G06F 16/387 | |
| 11,694,525 | B2 * | 7/2023 | Buchholz | G08B 17/103 | 340/540 |
| 2004/0095253 | A1 * | 5/2004 | Tanguay | G08B 5/38 | 340/628 |
| 2004/0112114 | A1 * | 6/2004 | Penney | G08B 29/145 | 73/1.01 |
| 2004/0189461 | A1 * | 9/2004 | Tice | G08B 29/183 | 340/522 |
| 2005/0258973 | A1 * | 11/2005 | Black | G08B 17/10 | 340/628 |
| 2006/0202847 | A1 * | 9/2006 | Oppelt | G08B 17/107 | 340/630 |
| 2006/0263733 | A1 | 11/2006 | Furner et al. | | |
| 2007/0020572 | A1 | 1/2007 | Furner et al. | | |
| 2007/0291472 | A1 | 12/2007 | Finkle | | |
| 2008/0170409 | A1 | 7/2008 | Tendo et al. | | |
| 2008/0291037 | A1 | 11/2008 | Lax | | |
| 2009/0267357 | A1 * | 10/2009 | Hall | E05B 63/125 | 292/99 |
| 2010/0073172 | A1 | 3/2010 | Lax | | |
| 2010/0328958 | A1 | 12/2010 | Zhang | | |
| 2011/0050104 | A1 | 3/2011 | Finkle | | |
| 2011/0080736 | A1 | 4/2011 | Brands et al. | | |
| 2011/0187543 | A1 | 8/2011 | Russo et al. | | |
| 2011/0193697 | A1 | 8/2011 | Albert et al. | | |
| 2012/0086345 | A1 | 4/2012 | Tran | | |
| 2012/0160642 | A1 * | 6/2012 | Liao | H01H 13/023 | 200/310 |
| 2012/0171987 | A1 * | 7/2012 | Newman | G08B 25/08 | 455/404.1 |
| 2012/0238319 | A1 | 9/2012 | Lake | | |
| 2012/0286940 | A1 * | 11/2012 | Carmen, Jr. | F21V 33/0052 | 362/555 |
| 2012/0321321 | A1 * | 12/2012 | Riesebosch | H04B 10/116 | 398/118 |
| 2013/0094218 | A1 | 4/2013 | Wang et al. | | |
| 2013/0155690 | A1 | 6/2013 | Chen et al. | | |
| 2014/0085093 | A1 * | 3/2014 | Mittleman | G08B 21/14 | 29/832 |
| 2014/0239162 | A1 | 8/2014 | Carlson et al. | | |
| 2014/0268753 | A1 | 9/2014 | Buchholz et al. | | |
| 2014/0292506 | A1 * | 10/2014 | Rapeanu | F21V 23/045 | 340/514 |
| 2014/0333928 | A1 * | 11/2014 | Erdtmann | G08B 17/103 | 356/338 |
| 2014/0340913 | A1 * | 11/2014 | Cui | F21K 9/232 | 362/382 |
| 2015/0096352 | A1 * | 4/2015 | Peterson | G08B 29/185 | 73/31.02 |
| 2015/0097689 | A1 * | 4/2015 | Logue | H04W 4/029 | 340/632 |
| 2015/0109137 | A1 * | 4/2015 | Carrington | F21V 5/045 | 340/815.4 |
| 2015/0339896 | A1 * | 11/2015 | Stagg | G08B 17/113 | 340/521 |
| 2016/0027266 | A1 * | 1/2016 | McDonagh | G08B 7/062 | 340/815.4 |

(56) References Cited

U.S. PATENT DOCUMENTS

| | | | | |
|---|---|---|---|---|
| 2016/0033115 | A1* | 2/2016 | Savage, Jr. | G08B 5/36 248/213.2 |
| 2016/0088202 | A1 | 3/2016 | Tsai et al. | |
| 2017/0085319 | A1* | 3/2017 | Latham | H04L 12/40 |
| 2017/0089567 | A1* | 3/2017 | Penrod | F21S 9/02 |
| 2017/0140619 | A1 | 5/2017 | Russo et al. | |
| 2017/0154740 | A1* | 6/2017 | Luo | H01H 13/83 |
| 2017/0184292 | A1* | 6/2017 | Weeks | H05B 47/11 |
| 2017/0200575 | A1 | 7/2017 | Ford | |
| 2017/0314776 | A1* | 11/2017 | Huang | F21V 7/04 |
| 2017/0328997 | A1* | 11/2017 | Silverstein | G01S 13/765 |
| 2017/0336055 | A1* | 11/2017 | Rinko | F21V 31/005 |
| 2018/0066806 | A1 | 3/2018 | Wang et al. | |
| 2018/0128478 | A1 | 5/2018 | Beyer | |
| 2018/0142880 | A9 | 5/2018 | Huang | |
| 2018/0212371 | A1* | 7/2018 | Xu | H04R 1/028 |
| 2018/0310389 | A1 | 10/2018 | Recker et al. | |
| 2018/0343402 | A1* | 11/2018 | Roth | H04N 5/2351 |
| 2019/0069078 | A1* | 2/2019 | Johnson | H04R 1/025 |
| 2019/0181595 | A1* | 6/2019 | Jensen | H01R 13/701 |
| 2019/0203888 | A1* | 7/2019 | Kraz | G02B 6/0051 |
| 2019/0285269 | A1* | 9/2019 | Penrod | H04R 1/028 |
| 2019/0297706 | A1 | 9/2019 | Huang et al. | |
| 2019/0304281 | A1* | 10/2019 | Mott | G08B 5/36 |
| 2019/0311595 | A1 | 10/2019 | Lacy | |
| 2020/0294735 | A1* | 9/2020 | Wu | H01H 13/50 |
| 2021/0142638 | A1* | 5/2021 | Buchholz | G08B 5/38 |
| 2021/0158663 | A1* | 5/2021 | Buchholz | G08B 17/06 |
| 2022/0277634 | A1* | 9/2022 | Buchholz | G08B 5/38 |

FOREIGN PATENT DOCUMENTS

| | | | |
|---|---|---|---|
| CN | 102214653 | B | 2/2013 |
| CN | 202852641 | U | 4/2013 |
| CN | 203188142 | U | 9/2013 |
| CN | 103515131 | A | 1/2014 |
| CN | 303087957 | S | 1/2015 |
| CN | 303093901 | S | 2/2015 |
| CN | 206989056 | U | 2/2018 |
| DE | 102008029698 | A1 | 1/2010 |
| EP | 1261978 | A1 | 12/2002 |
| EP | 2455651 | A2 | 5/2012 |
| EP | 2480822 | A1 | 8/2012 |
| EP | 2518747 | A1 | 10/2012 |
| FR | 2975809 | A1 | 11/2012 |
| KR | 200262311 | Y1 | 3/2002 |
| KR | 200307344 | Y1 | 3/2003 |
| WO | D51537 | | 2/2000 |
| WO | 0169617 | A1 | 9/2001 |
| WO | 2011037884 | A1 | 3/2011 |
| WO | 2014162131 | A1 | 10/2014 |
| WO | 2017045378 | A1 | 3/2017 |
| WO | 2019014112 | A1 | 1/2019 |

OTHER PUBLICATIONS

"ADA Compliant Solutions"; Product Description; SDC Security Door Controls; Retrieved Online from http://www.sdcsecurity.com/ADA-Compliant-Solutions.htm; Feb. 25, 2019; 4 Pages.

"Big Dome Pushbutton Red, Product Description"; Sparkfun Electronics; Retrieved Online from https://www.sparkfun.com/products/9181; Feb. 25, 2019; 8 Pages.

"LA42(A) Series (22) 22 MM Waterproof Push Button Switches"; Tayee; Product Description; Retrieved Online from http://www.tayee-electric.com/product/la42-aseries-22-push-button-switch.html; Feb. 25, 2019; 2 Pages.

"Meridian LED Push-Button Tap Light"; Product Description; Walmart.com; Retrieved Online from https://www.walmart.com/ip/Meridian-LED-Push-Button-Tap-Light-Silver/26441657; Feb. 25, 2019; 8 Pages.

"The Lightning Push-Button Switch (LAS1GQ-11D) Only"; CNIPA; International Design; CN300781532; Zhejiang Hongbo Button Manufacturing Co. Ltd.; May 21, 2008; 2 Pages.

European Office Action; European Application No. 18746451.6; dated Dec. 2, 2021; 8 pages.

International Search Report Issued in International Application No. PCT/US2018/041267 dated Dec. 19, 2018; 8 Pages.

International Search Report; PCT/US2019/024907; ISR/EPO; dated Jul. 4, 2019; 5 Pages.

Non-Final Office Action; U.S. Appl. No. 16/290,482; dated Oct. 18, 2019; 22 pages.

U.S. Final Office Action; U.S. Appl. No. 16/290,482; dated Apr. 16, 2020; 16 pages.

U.S. Non-Final Office Action; U.S. Appl. No. 16/290,482; dated Oct. 18, 2019; 22 pages.

U.S. Notice of Allowance; U.S. Appl. No. 16/290,482; dated Jun. 26, 2020; 9 pages.

Wollaston; "The Smart Smoke Alarm That Texts You if There's a Fire in Your House and Really Can be Switched Off With a Wave of the Hand"; DailyMail.com; Retrieved Online from https://www.dailymail.co.uk/sciencetech.article-2451271/Smart-smoke-alarm-TEXTS-theres-house.html; Oct. 10, 2013; 28 Pages.

World Intellectual Property Organization Issued International Registration No. DM/051 537 dated Feb. 14, 2000; 6 Pages.

Written Opinion Issued in International Application No. PCT/US2018/041267 dated Dec. 19, 2018; 10 Pages.

European Office Action; European Application No. 19722297.9; dated Nov. 16, 2022; 5 pages.

U.S. Non-Final Office Action; U.S. Appl. No. 17/042,643; dated Jun. 22, 2023; 20 pages.

* cited by examiner

HAZARD DETECTOR WITH OPTICAL STATUS INDICATOR

CROSS-REFERENCE TO RELATED APPLICATIONS

This application is a Continuation of U.S. Non-Provisional application Ser. No. 16/629,838 filed Jan. 9, 2020, which is a 371 U.S. National Stage application of PCT/US2018/041267, filed Jul. 9, 2018, which claims the benefit of U.S. Provisional Application No. 62/530,728, filed Jul. 10, 2017, the disclosures of which are incorporated herein by reference in their entirety.

BACKGROUND

The disclosure relates to a life safety device for detecting one or more conditions, such as smoke and carbon monoxide for example. More specifically, the disclosure relates to a life safety device including a visual indicator for identifying each of the sensed conditions.

Regulations require the use of indicators to indicate the current status of a life safety detector. However, the current indicators used are small relative to the housing and are not aesthetically pleasing. Therefore, an objective of the disclosure is to provide an apparatus which visually indicates to a user a status of the device in a more aesthetically pleasing manner.

BRIEF DESCRIPTION

According to one aspect of the invention, a life safety device includes a housing, a detector for detecting one or more conditions, and an actuatable mechanism coupled to the housing. The actuatable mechanism includes a light assembly operable in response to detection of at least one of the one or more conditions.

In addition to one or more of the features described above, or as an alternative, in further embodiments the light assembly is automatically operable in response to detection of an unacceptable level of smoke or carbon monoxide.

In addition to one or more of the features described above, or as an alternative, in further embodiments the light assembly further comprises: a light source, a cover; and, a light skirt for communicating light from the light source to the cover.

In addition to one or more of the features described above, or as an alternative, in further embodiments the cover is generally flush with an exterior of the housing.

In addition to one or more of the features described above, or as an alternative, in further embodiments the cover has at least one feature formed thereon to alter light the light emitted by the light source.

In addition to one or more of the features described above, or as an alternative, in further embodiments the at least one feature includes a plurality of concentric rings to diffuse light emitted there through.

In addition to one or more of the features described above, or as an alternative, in further embodiments comprising a light transmission device positioned within the housing, wherein the light assembly is nested within the hollow interior of the light transmission device.

In addition to one or more of the features described above, or as an alternative, in further embodiments a shape of the light skirt is generally complementary to the light transmission device.

In addition to one or more of the features described above, or as an alternative, in further embodiments comprising a light blocking material positioned adjacent the light transmission device.

In addition to one or more of the features described above, or as an alternative, in further embodiments the cover includes at least one of tinting and printed text.

In addition to one or more of the features described above, or as an alternative, in further embodiments the light assembly is an egress light having a brightness sufficient to illuminate an adjacent pathway or exit.

In addition to one or more of the features described above, or as an alternative, in further embodiments actuation of the actuatable mechanism is configured to perform an operation associated with the life safety device.

In addition to one or more of the features described above, or as an alternative, in further embodiments actuation of the actuatable mechanism initiates a test operation.

In addition to one or more of the features described above, or as an alternative, in further embodiments actuation of the actuatable mechanism performs a hush operation.

In addition to one or more of the features described above, or as an alternative, in further embodiments actuation of the actuatable mechanism enrolls the life safety device within a system, the life safety device being configured to communicate wirelessly.

In addition to one or more of the features described above, or as an alternative, in further embodiments the housing includes a lower housing portion and the actuatable mechanism is arranged adjacent a center of the lower housing portion.

According to another embodiment, a method of operating a life safety device includes sensing a condition via at least one detector of the life safety device and illuminating a light assembly of the life safety device in response to sensing the condition. The light assembly is formed as part of an actuatable mechanism visible at an exterior of a housing of the life safety device.

In addition to one or more of the features described above, or as an alternative, in further embodiments illuminating the light assembly occurs automatically in response to sensing the condition.

In addition to one or more of the features described above, or as an alternative, in further embodiments illuminating the light assembly indicates a location of an exit.

In addition to one or more of the features described above, or as an alternative, in further embodiments operation of the actuatable mechanism does not directly control illumination of the light assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
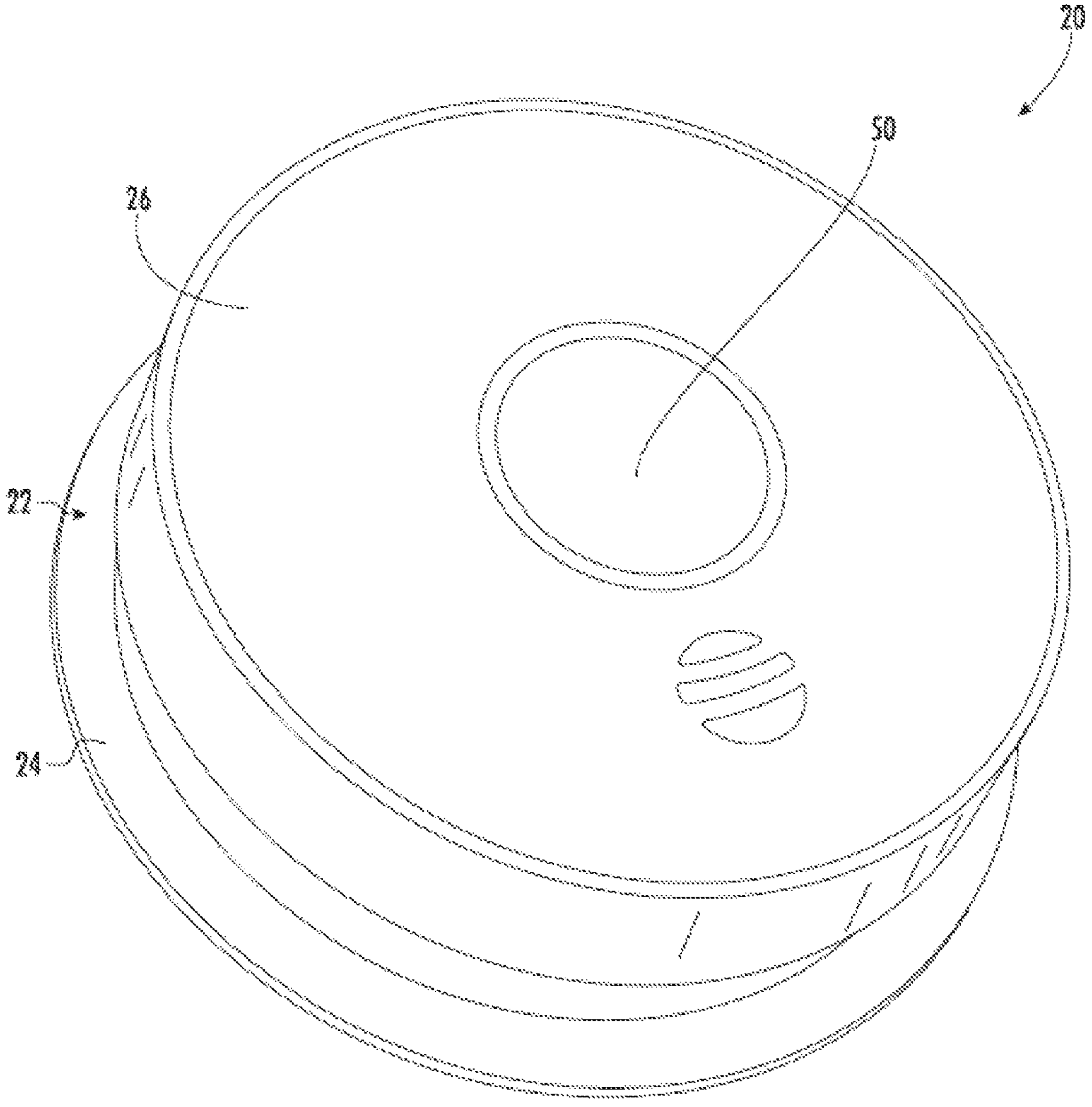
FIG. 1 is a perspective view of an example of a life safety device according to an embodiment.
Figure 2:
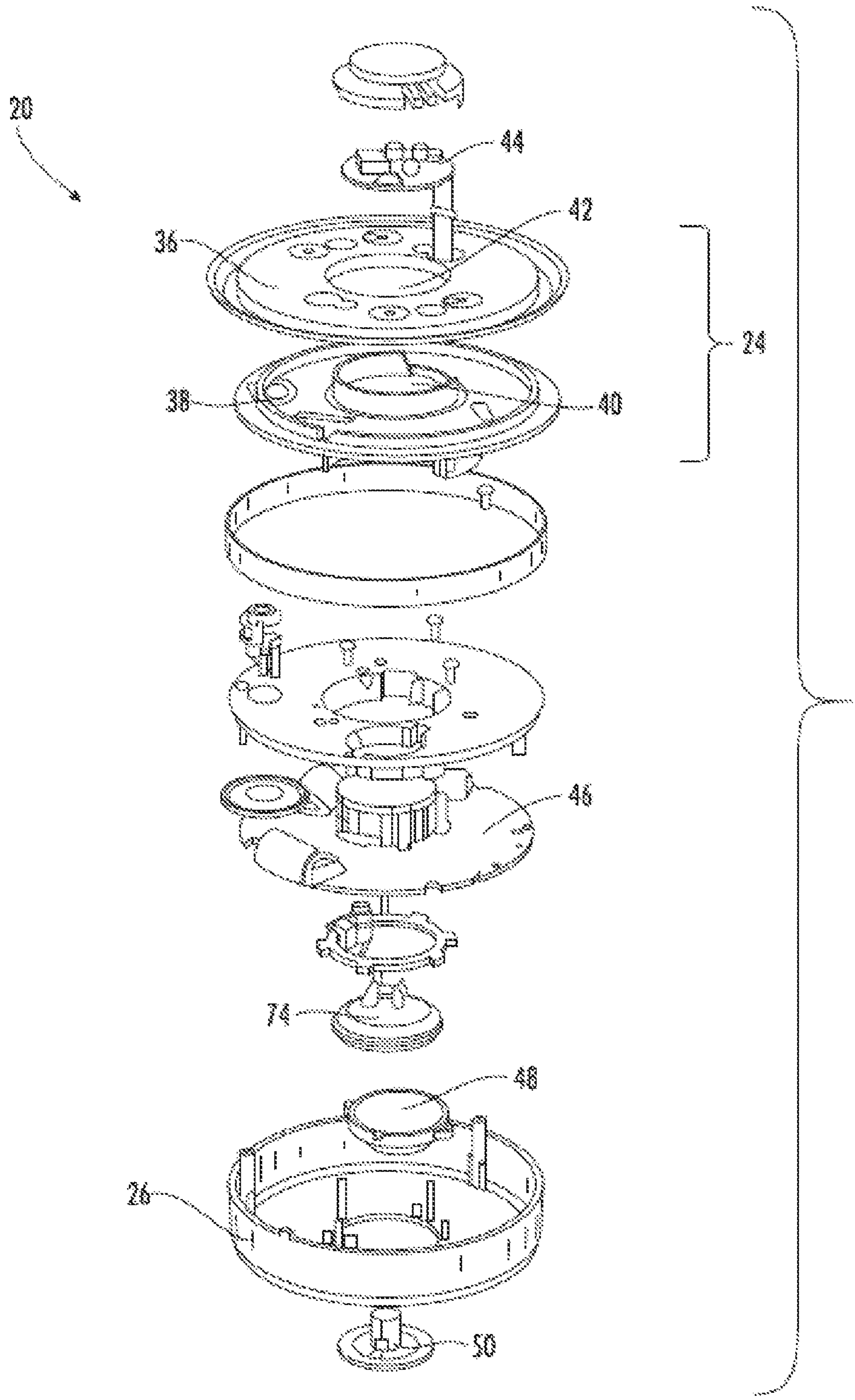
FIG. 2 is an exploded view of the life safety device of FIG. 1 according to an embodiment.

Referring now to FIGS. 1 and 2, an example of a life safety device 20 is illustrated. The life safety device 20 includes a housing assembly 22 having a first, upper housing portion 24 and a second, lower housing portion 26 that is removably connected to the first housing portion 24. The life safety device 20 further includes a control system 30 including at least one detection circuit 32 and at least one alarm circuit 34 to be described in more detail below with reference to FIGS. 3 and 4. When the first and second housing portions 24, 26 are connected, the first and second housing portions 24, 26 enclose the control system 30 and other components necessary to operation of the device 20. As used herein, the terms "upper", "lower", and the like are in reference to the device 20 in use as it is mounted on a surface, such as a ceiling in a building for example. Therefore, the upper housing portion 24 is typically closer to the ceiling than the lower housing portion 26, and the lower housing portion 26 is typically the portion of the device 20 that will face downward toward the floor of the building. In some embodiments device 20 may be mounted on a wall such that upper housing portion 24 is closer to the wall than the lower housing portion 26, and the lower housing portion 26 is typically the portion of the device 20 that will face outward toward the interior space of the room or space to be monitored.

In the non-limiting embodiment of FIG. 2, the upper housing portion 24 includes a base plate 36 and a trim plate 38 disposed upwardly adjacent the base plate 36. The trim plate 38 is typically positioned adjacent to or flush with a mounting surface, such as a ceiling or wall for example. As shown, both the trim plate 38 and the base plate 36 include a centrally located opening 40, 42 respectively, having a similar size and shape. In embodiments where the device 20 is "hardwired", a power source 44 located within the mounting surface, such as an AC power supply for example, may extend into the aligned openings 40, 42.

A printed circuit board 46 is disposed generally between the base plate 36 and an adjacent surface of the lower housing portion 26. The printed circuit board 46 includes the circuitry and/or components associated with the at least one detection circuit 32 and at least one alarm circuit 34. In embodiments where the life safety device 20 is "hardwired", the printed circuit board 46 is directly connected to the power source 44. In such embodiments, part of the printed circuit board 46 may extend into the central opening 40, 42 of the upper housing portion 24 to connect to the power source 44. The printed circuit board 46 may be adapted to receive one or more batteries sufficient to provide power thereto to operate the device 20 for an extended period of time. The power provided by the batteries may be the sole source of power used to operate the device 20, or alternatively, may be supplemental to the power source 44, for example in the event of a failure or loss of power at the power source.

A sound generation mechanism 48 may be disposed between the printed circuit board 46 and the lower housing portion 26. The sound generation mechanism 48 receives power from the printed circuit board 46 to generate a noise in response to detection of a condition. Coupled to the lower housing portion 26 is an actuatable mechanism 50, such as a button. The actuatable mechanism 50 may be a button configured to perform one or more functions of the life safety device 20 when actuated. Examples of operations performed via the actuatable mechanism 50 include, but are not limited to, a press to test function, a smoke alarm "hush", a low battery "hush", and end of life "hush", radio frequency enrollment of additional life safety detectors 20 such as in a detection system including a plurality of life safety detectors configured to communicate with one another wirelessly, and to reset the unit once removed from its packaging for example.

In the illustrated, non-limiting embodiment, the actuatable mechanism 50 is received within an opening formed in the lower housing portion 26, and is operably coupled to a control system 30 of the printed circuit board 46. Although the actuatable mechanism 50 is shown positioned at the center of the lower housing portion, embodiments where the actuatable mechanism 50 is located at another position are also within the scope of the disclosure. Further, it should be understood that in embodiments where the actuatable mechanism 50 performs multiple operations, there may be only a single actuatable mechanism 50 located on the detector 20 and no other mechanism is required. Alternatively, the detector 20 may include a plurality of actuatable mechanisms 50, each being operable to perform a distinct function or the actuatable mechanism 50 may be divided to form a plurality of actuatable mechanisms. In embodiments where the detector 20 includes a plurality of separate actuatable mechanisms 50, the actuatable mechanisms 50 may be located at any location relative to the housing 22.

Figure 3:
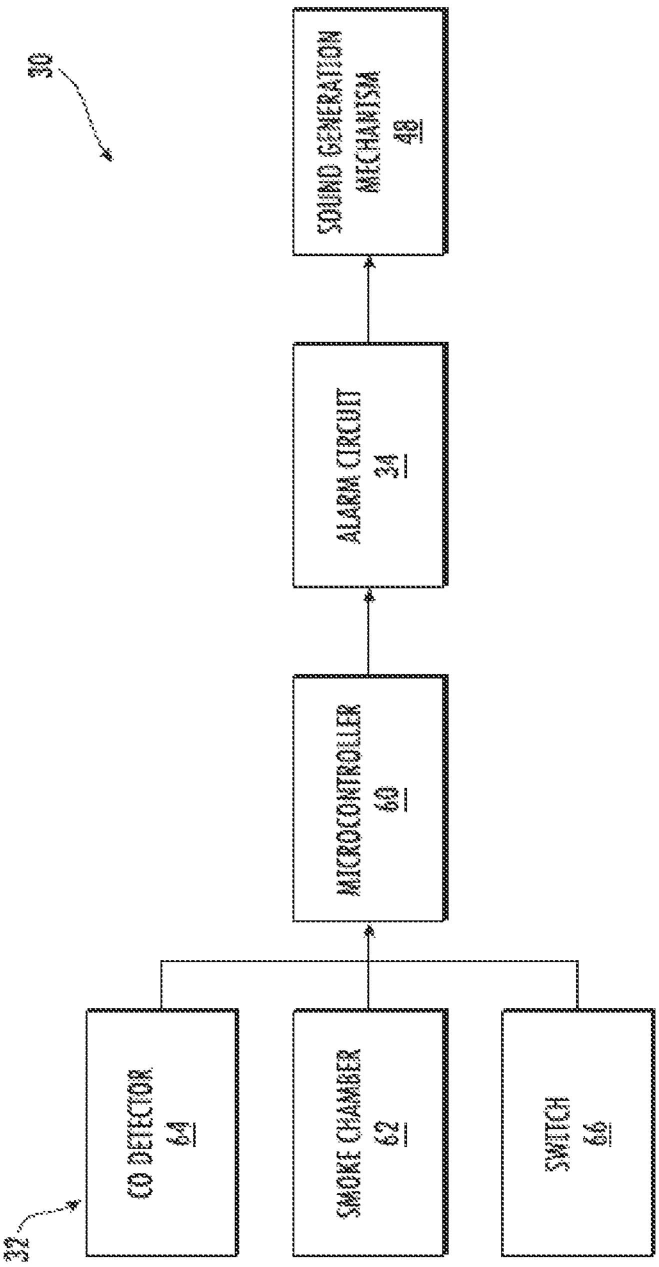
FIG. 3 is a schematic diagram of a control system of a life safety device according to an embodiment.

With reference FIG. 3, a schematic diagram of an example of a control system 30 of the device 20 is shown in more detail. The control system 30 includes a microcontroller 60 operable to receive an input from the at least one detector circuit 32, for example from a conventional ion or photoelectric smoke chamber 62 and a carbon monoxide detector circuit 64. However, it should be understood that the detector 20 may be adapted for detection of a variety of hazardous conditions, including but not limited to smoke, carbon monoxide, explosive gas, and heat for example. It will also be understood from the following that the particular technology of the detector circuits 62, 64 are not a limiting aspect of the invention. Further, while the discussion herein refers to a microcontroller, one skilled in the art will recognize that the functionality and intelligence associated with this element may be alternatively embodied in a microprocessor with associated input/output and buffering circuits, in a programmable logic device (PLD), in an application specific integrated circuit (ASIC), of other intelligent, programmable device. Therefore, the use of the term microcontroller herein shall be construed to cover all of these alternative structures as well.

The microcontroller 60 also receives an input from a user-actuated switch 66 input, for example coupled to the actuatable mechanism 50. The microcontroller 60 utilizes the inputs from these components 62, 64, 66 to generate an output alarm condition when the sensed environmental conditions so dictate. A single alarm circuit 34 is utilized to broadcast via the sound generation mechanism 48 the appropriate audible sound, depending on which condition has been detected. The alarm circuit 34 may include both tone and synthesized voice message generation capabilities, or may be a simple piezo-electric type device. It should be understood that the life safety device 20 illustrated and described herein is intended as an example only and that a life safety device 20 having any configuration and capability is contemplated herein.

Figure 4:
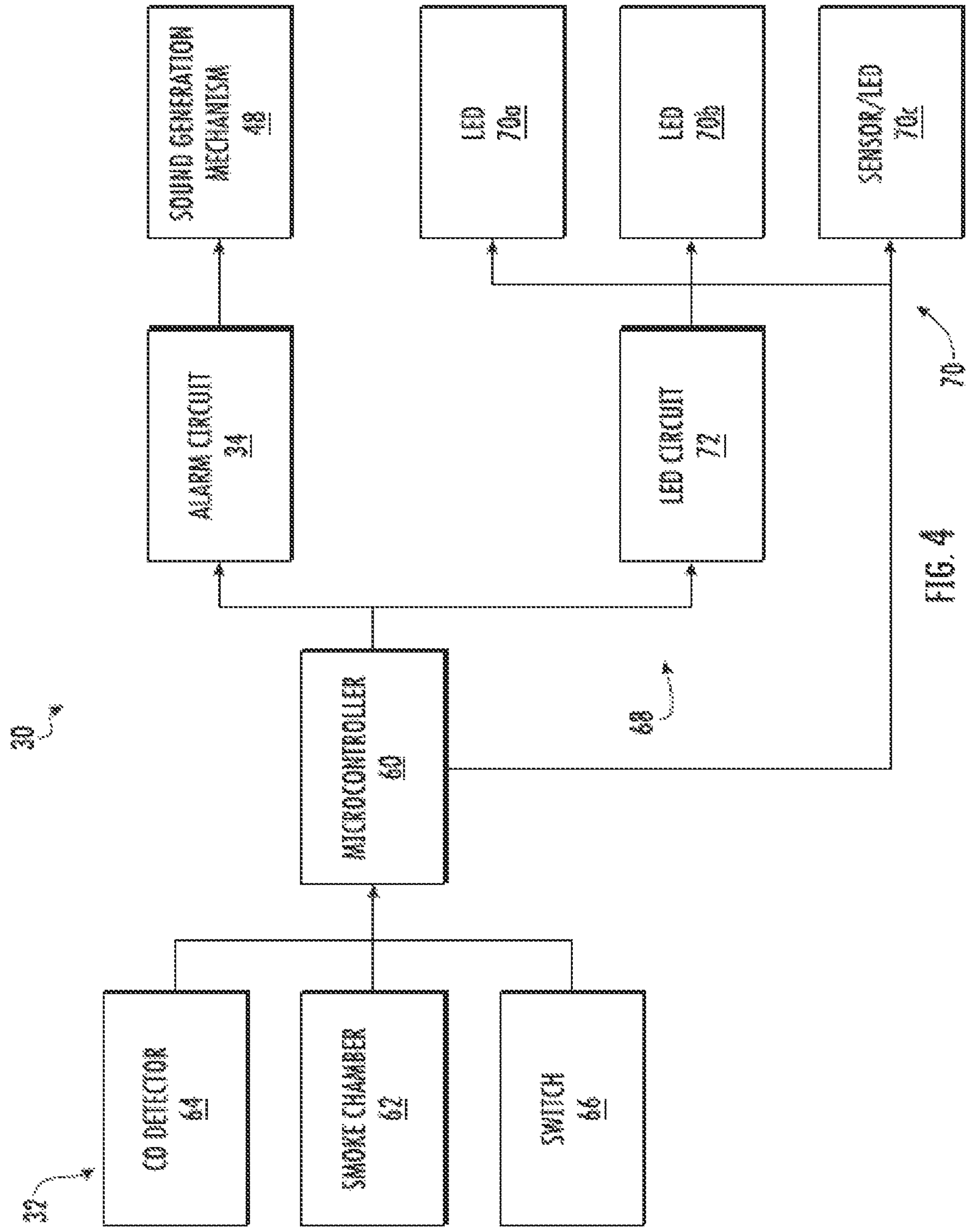
FIG. 4 is a schematic diagram of a control system of a life safety device according to another embodiment.

With reference now to FIG. 4, in an embodiment, the control system 30 of the device 20 additionally includes a visual warning system 68 including at least one light source 70, such as a light emitting diode (LED) for example, and a circuit 72 for operating the light source 70. The light generated by the at least one LED 70 is visible through the housing 22, such as through the lower housing portion 26 for example. The at least one light source 70 may be controlled to generate distinct outputs in response to a plurality of detected conditions. Although light source 70 is described herein as an LED, in some embodiments other types of illumination sources may be used in alternative or in addition to an LED.

In an embodiment, the device 20 includes a light transmission device 74, such as a light pipe for example, positioned within the housing 22 generally between the printed circuit board 46 and the lower housing portion 26 (see FIG. 2). Inclusion of the light transmission device 74 enhances the visibility of the light output by the LED 70 at the exterior of the device 20. The light transmission device 74 is a passive device formed from a clear or generally transparent plastic material and is configured to diffuse and evenly distribute the light generated by the at least one LED 70.

Figure 5:
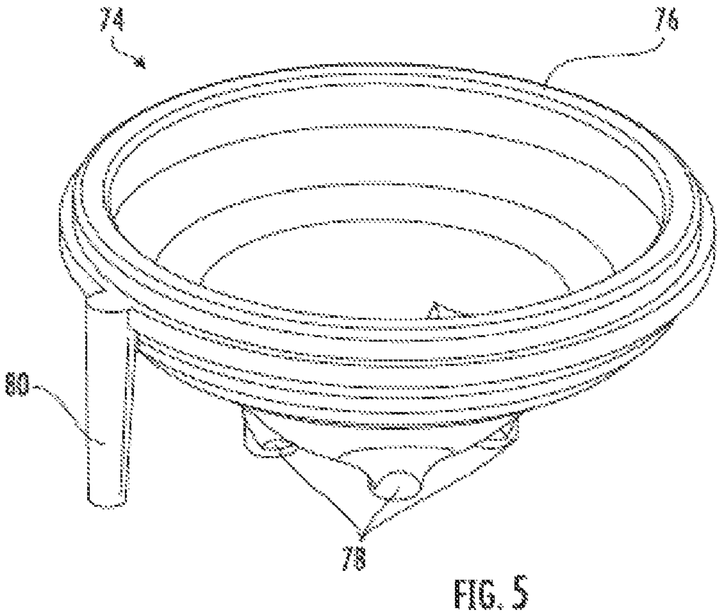
FIG. 5 is a perspective view of a light transmission device of the life safety device according to an embodiment.
Figure 6:
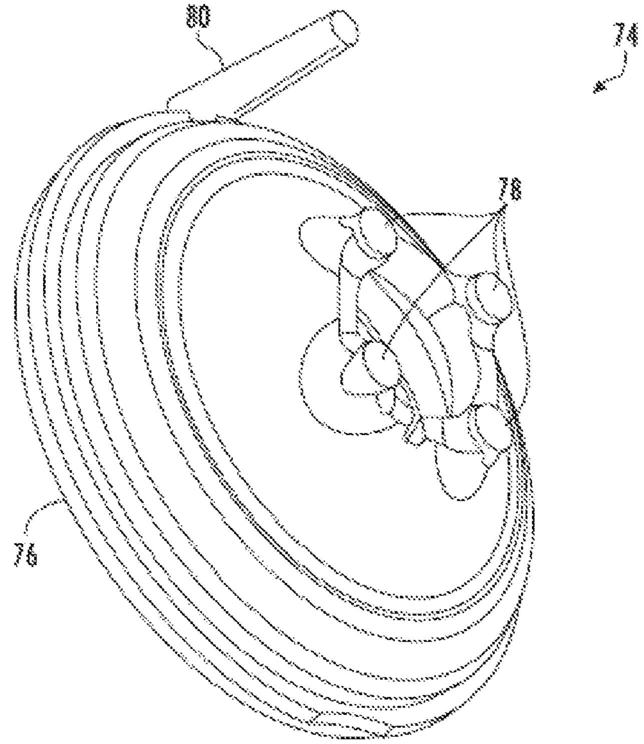
FIG. 6 is another perspective view of a light transmission device of the life safety device according to an embodiment.

An example of the light transmission device 74 is illustrated in more detail in FIGS. 5 and 6 In the illustrated non-limiting embodiment, the light transmission device 74 is hollow and generally conical or frustoconical in shape. However, other shapes are also within the scope of the disclosure. A first end 76 of the light transmission device 74 may extend through an opening formed in the lower housing portion 26 adjacent the actuatable mechanism 50. In an embodiment, the first end 76 of the light transmission device 74 is concentric and therefore coaxial with the actuatable mechanism 50 relative to the lower housing portion 26. As a result, an inner diameter of the light transmission device 74 adjacent the first end 76 is generally equal to or complementary to an outer diameter of the actuatable mechanism 50. However, embodiments where the light transmission device 74 is spaced away from or apart from the actuatable mechanism 50 are also within the scope of the disclosure.

The light transmission device 74 additionally includes at least one port 78 located adjacent the at least one LED 70 for communicating light to the first end 76. In embodiments where the visual warning system 68 includes a plurality of LEDS 70, the light transmission device 74 may include a plurality of ports 78, each of which is associated with a distinct LED 70 of the plurality of LEDs. However, in other embodiments, a port 78 may be associated with more than one of the plurality of LEDs 70. In the illustrated, non-limiting embodiment, the visual warning system 68 includes at least two LEDs. A first LED **70*a* has a first color, such as green for example, and the second LED 70*b* has a second distinct color, such as red for example. The LEDs 70** may be operated independently to generate either the first color or the second color, and may be operated in unison to create a third color, distinct from the first and second colors.

As an example, a green LED **70*a* may be operated in unison with a red LED 70*b* to create a yellow color. However, embodiments where the system 68 includes another LED having a third color associated therewith are also contemplated herein. As another example, if a blue LED is included, a red LED 70*a* and a blue LED 70*b* may be operated in unison to create magenta; in yet another example, a green LED 70*a* and a blue LED 70*b* may be operated in unison to create cyan. In addition, it should be understood that the system 68 may include one or more LEDs associated with each color, such as two green LEDs and two red LEDs for example. This may allow different levels of brightness. Additional colors may be operated independently. Further, it should be understood that a system 68 having any number of LEDS 70**, including one LED or more than two LEDs, as well as any number of colors associated therewith is contemplated herein.

In addition, the light transmission device 74 has a bi-directional configuration. Accordingly, light is not only transmitted from the at least one LED 70 through the device 74 to the exterior of the housing 22, but also ambient light may be transmitted through the light transmission device 74 to a sensor capable of measuring the ambient light to determine a time of day and select a corresponding mode of operation. The at least one LED 70 may be operable as the sensor for measuring ambient light. In such embodiments, the at least one LED 70 converts ambient light transmitted thereto into a voltage that can be used to identify a corresponding time of day. The at least one LED 70 is therefore operable as both a transmitter for generating light, and a receiver for receiving and measuring ambient light. In the illustrated, non-limiting embodiment, a distinct LED, **70*c***, is configured as the sensor for measuring ambient light.

Figure 7:
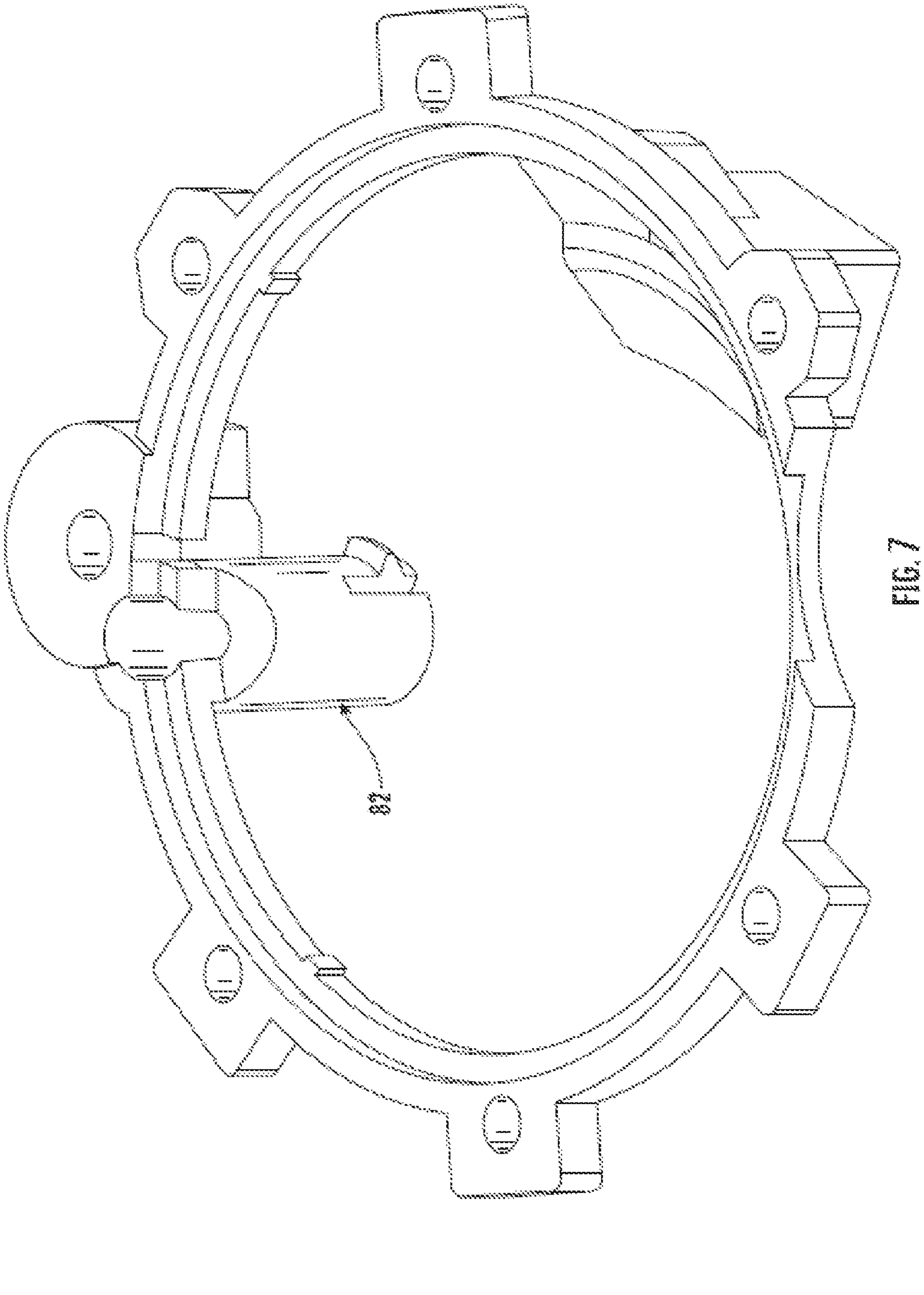
FIG. 7 is a perspective view of a blocking material associated with the light transmission device according to an embodiment.

In the illustrated, non-limiting embodiment, the light transmission device 74 additionally includes a post 80, separate from the ports 78, for communicating ambient light to the sensor, LED **70*c*. The post 80 may be encased within a light blocking material 82, illustrated in FIG. 7, to prevent light transmitted by any of the plurality of LEDs 70 from interfering with the ambient light. Light blocking material 82 may be disposed between light transmission device 74 and lower housing portion 26. As shown, the post 80 is radially offset from the center of the light transmission device 74, but other configurations of post 80 and light blocking material 82** are within the scope of the disclosure.

During operation of the device 20, ambient light is communicated through the light transmission device 74, specifically through the post 80, to the adjacent LED **70*c*. The microcontroller 60 processes the voltage information provided by LED 70*c* to determine a time of day and control operation of the device 20** in either a daytime mode or night time mode.

Figure 8:
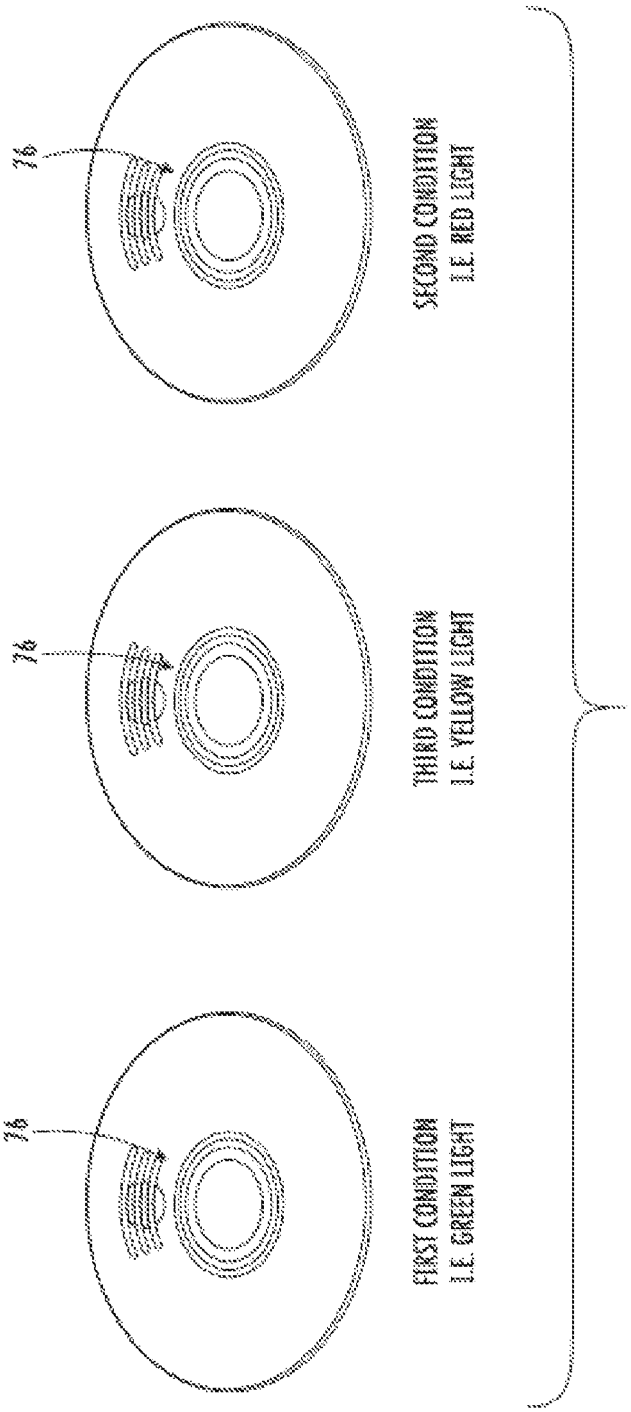
FIG. 8 is a perspective view of a life safety device in various conditions according to an embodiment.

In the daytime mode, the visual warning system 68 continuously indicates a status of the detected conditions and/or of the device 20. With reference to FIG. 8, in the illustrated, non-limiting embodiment, if no condition has been detected by the device 20, a first LED, such as the green LED **70*a* for example, is illuminated. The light generated by the first LED 70*a*, is transmitted through an adjacent port 78 in the light transmission device 74 to illuminate the first end 76 of the device 74. If a dangerous condition has been detected, such as an unacceptable level or either carbon monoxide or smoke for example, a second LED, such as the red LED 70***b*, will be operated. The light from the LED 70*b* will transmit through an adjacent port 78 in the light transmission device 74 to illuminate the first end 76 of the device 74, visible at the exterior of the housing 22.

In an embodiment, if an error within the device 20 is detected, both the first LED 70*a* and the second LED 70*b* are operated. The red and green light are transmitted into the light transmission device 74 where they mix to create a yellow light visible at the first end 76 thereof. Accordingly, a first color is visible at the exterior of the housing 22 during a first condition, a second color visible at the exterior of the housing 22 during a second condition, and in some embodiments, a third color is visible at the exterior of the housing 22 during a third condition. The colors and functions illustrated and described herein are intended as an example only. Other exemplary conditions such as a pending or unconfirmed alarms may be demonstrated with additional colors or light patterns.

In some embodiments, when operating in the daytime mode, the LED 70*c* operating as the ambient light sensor may be configured to continuously measure the ambient light and/or provide an indication of the ambient light to the microcontroller 60. Alternatively, the LED 70*c* may be configured to measure the ambient light and/or provide an input of the ambient light to the microcontroller 60 at intervals. In an embodiment, upon detection of a reduced amount of ambient light indicating a time of day after sunset or that the lights within an area adjacent the device 20 are not on, operation of the first and second LEDs 70*a*, 70*b* is generally discontinued and the device 20 is transitioned to operation in a night time mode. However, it should be understood that upon detection of a corresponding condition, these LEDs 70*a*, 70*b* may be activated regardless of whether the device 20 is in a daytime mode or a night time mode. Furthermore, the operation of the LEDs 70*a*-70*n* may differ depending on the current state of the device 20, e.g. if the device is in test or setup mode.

In the night time mode, the LED 70*c* is selectively operated as both a receiver and transceiver. Power is supplied to the LED 70*c* in a manner causing the LED 70*c* to pulse or flash to reduce the level or nuisance to a person nearby. In an embodiment, the brightness of the LED 70*c* is less than the brightness of the LEDS 70*a*, 70*b*. When the LED 70*c* is illuminated, light transmits through the post 80 to the end 76 of the light transmission device 74. During the periods between the flashes, a measurement of the ambient light communicated to the LED 70*c* via the post 80 is taken. Upon determining that the lights within the area adjacent the device 20 are on or that the sun has risen, the device 20 will transform to the daytime mode.

Although the LED 70*c* for measuring the ambient light is illustrated and described herein as being distinct from the LEDS 70*a*, 70*b* operable during the daytime mode, it should be understood that the same LED may be used in both modes of operation. For example, the LED 70*c* may be a green LED, operable in place of LED 70*a* during the daytime mode. Further, the intensity level of the color output by such an LED may vary based on the mode of operation of the device 20. In an embodiment, the intensity of the color output by the LED may be controlled via the current supplied thereto or via pulse width modulation. In some embodiments, LED 70*c* may be a separate color LED 70*c* as described above, or in some embodiments may the same LED as LED 70*a* or 70*b*. In embodiments where an alternate light source incapable of communicating voltage based on ambient light, or in other embodiments where a separate LED is desirable, LED 70*c* may function to provide voltage information from received ambient light rather than to transmit light.

Figure 9:
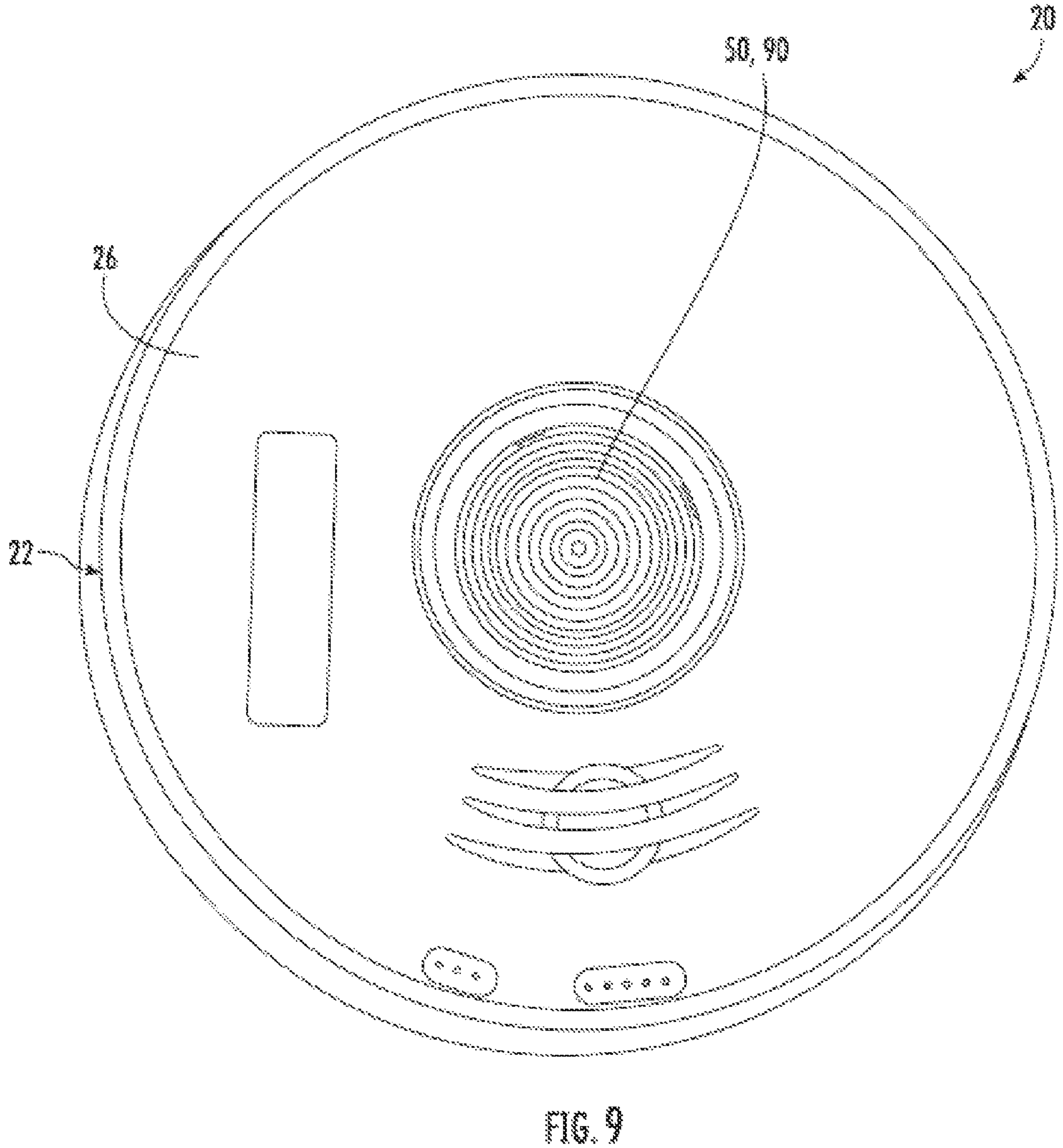
FIG. 9 is a plan view of a life safety device including a light assembly according to another embodiment.
Figure 10:
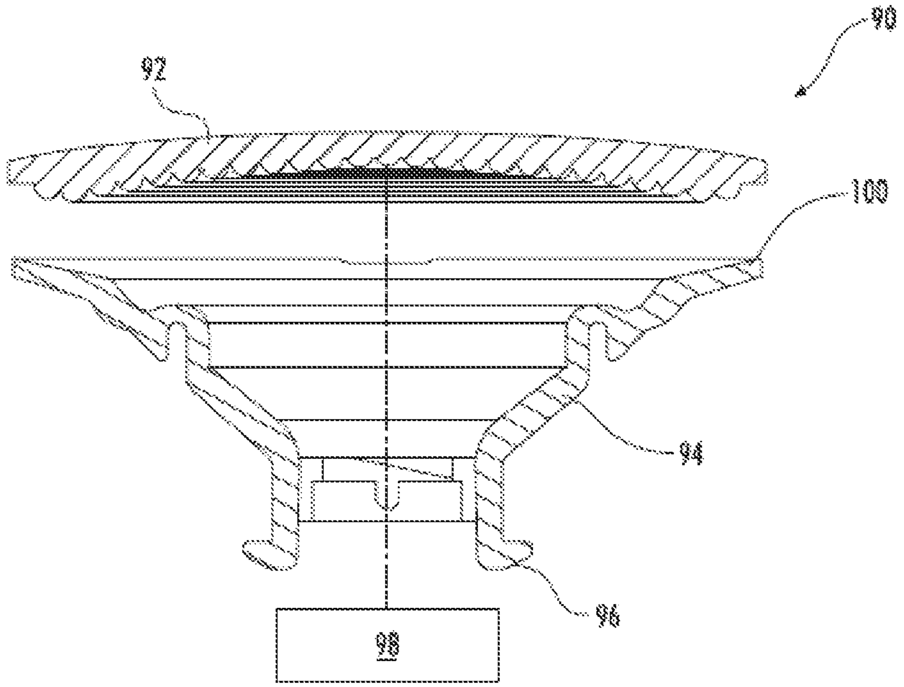
FIG. 10 is a cross-sectional exploded view of a light assembly according to an embodiment.
Figure 11:
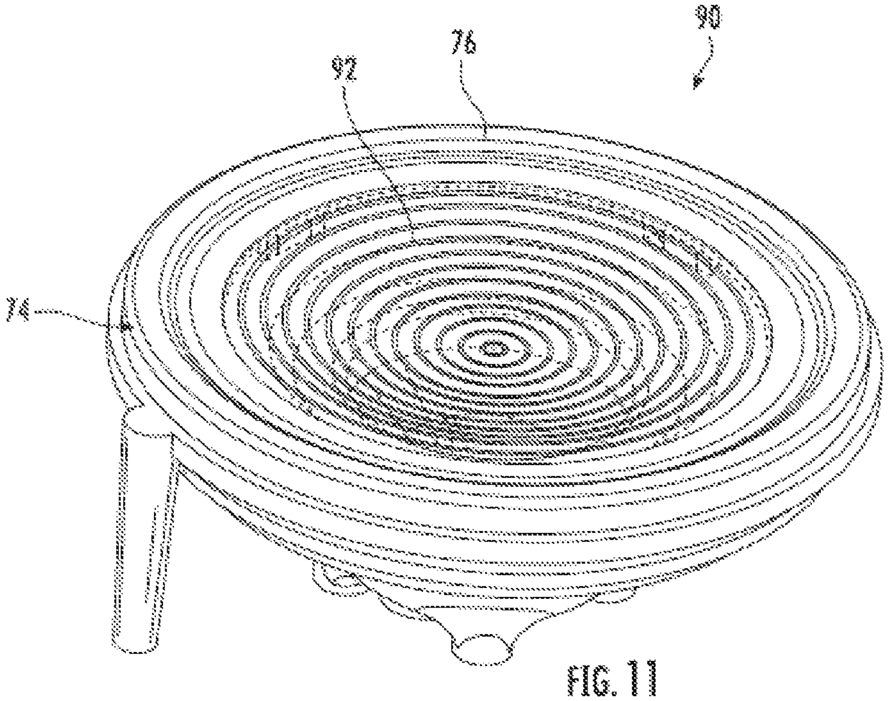
FIG. 11 is a perspective view of an actuatable mechanism including a light assembly according to an embodiment.

With reference now to FIGS. 9-11, in an embodiment, the actuatable mechanism 50 visible at the exterior of the lower housing portion 26 includes a light assembly 90 embedded therein. As shown in the FIGS., the exposed surface of the actuatable mechanism 50 includes a transparent cover or lens 92 connected to a light skirt 94. Although the cover 92 is shown as have a generally convex curvature, embodiments where the cover is generally planar are also contemplated herein. Further, in an embodiment, the cover 92 may include a feature, such as a plurality of concentric rings formed therein to diffuse light. The concentric rings may also focus light. However, embodiments without concentric rings and/or with a feature including alternative textures such as ridges, or patterns formed therein, or a lens array are also contemplated herein. In some embodiments cover 92 may include tinting and/or printed text as described below.

A first end 96 of at least a portion of the light skirt 94 is positioned adjacent an LED, illustrated schematically at 98. In an embodiment, the skirt 94 may include a port (not shown) having a first end positioned generally adjacent the LED 98. The LED 98 is distinct from the LEDs associated with the light transmission device 74. The light emitted by the LED 98 is transmitted through the light skirt 94 to the cover 92 positioned adjacent the second end 100. By forming the second end 100 of the skirt 94 with a diameter greater than the portion adjacent the LED 96, the area adjacent the device 20 illuminated by the LED 96 is increased.

In an embodiment, illustrated in FIG. 11, the components of the light assembly 90 are nested within the hollow interior of the light transmission device 74. In such embodiments, the shape of the light skirt 94 may be generally complementary to the interior of the light transmission device 74. Further, the exposed surface of the cover 94 may be flush with the first end of the light transmission device 74, or alternatively, may be offset therefrom. Although the light assembly 90 of the actuatable mechanism 50 is illustrated as being housed within the light transmission device, application of an actuatable mechanism 50 including a light assembly 90 is not limited to life safety devices 20 including a light transmission device 74 as described herein.

The light assembly 90 of the actuatable device 50 is automatically operable in response to detection of a predetermined condition. In an embodiment, the light assembly 90 is activated by the microcontroller 60 in response to an alarm condition where an unacceptable level or either carbon monoxide or smoke has been detected. In general, however, operation of the actuatable mechanism 50 does not directly control i.e. turn on and off the light assembly 90. In some embodiments, the light output by the light assembly 90 has a brightness or intensity intended to illuminate the adjacent area in order to provide a person in the area with enough visibility to identify an exit or a pathway to the nearest exit, for example at night or in the event of a power failure, or may be placed to indicate the location of an exit. In an alternative embodiment, cover 92 may include tinting and/or printed text to indicate the location of an exit or other information.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A life safety device comprising:
a housing;
a detector for detecting one or more conditions, the one or more conditions including at least one smoke and carbon monoxide;
an actuatable mechanism movably coupled to the housing;
a light assembly including a first light source operable to transmit light at an exterior of the housing through the actuatable mechanism, the first light source being operable in response to detection of at least one of the one or more conditions; and
a second light source operable to transmit light at an exterior of the housing, the second light source being remote from the first light source, wherein the second light source is operable as an ambient light sensor.

2. The life safety device of claim 1, wherein the light assembly is automatically operable in response to detection of an unacceptable level of smoke or carbon monoxide.

3. The life safety device of claim 1, wherein the light assembly further comprises:
a cover; and
a light skirt for communicating light from the light source to the cover.

4. The life safety device of claim 3, wherein the cover is generally flush with an exterior of the housing.

5. The life safety device of claim 3, wherein the cover has at least one feature formed thereon to alter light the light emitted by the first light source.

6. The life safety device of claim 5, wherein the at least one feature includes a plurality of concentric rings to diffuse light emitted there through.

7. The life safety device of claim 3, further comprising a light transmission device positioned within the housing, wherein the light assembly is nested within a hollow interior of the light transmission device.

8. The life safety device of claim 6, wherein a shape of the light skirt is generally complementary to the light transmission device.

9. The life safety device of claim 6, wherein further comprising a light blocking material positioned adjacent the light transmission device.

10. The life safety device of claim 3, wherein the cover includes at least one of tinting and printed text.

11. The life safety device of claim 1, wherein the light assembly is an egress light having a brightness sufficient to illuminate an adjacent pathway or exit.

12. The life safety device of claim 1, wherein actuation of the actuatable mechanism is configured to perform an operation associated with the life safety device.

13. The life safety device of claim 12, wherein actuation of the actuatable mechanism initiates a test operation.

14. The life safety device of claim 12 wherein actuation of the actuatable mechanism performs a hush operation.

15. The life safety device of claim 12, wherein actuation of the actuatable mechanism enrolls the life safety device within a system, the life safety device being configured to communicate wirelessly.

16. The life safety device of claim 1, wherein the housing includes a lower housing portion and the actuatable mechanism is arranged adjacent a center of the lower housing portion.

* * * * *